United States Patent [19]

Shyr et al.

[11] Patent Number: 5,699,892

[45] Date of Patent: Dec. 23, 1997

[54] CHAIN TYPE TRANSFER DEVICE

[75] Inventors: Duen-Jyh Shyr, Tainian; Kuan-Chou Chen, Hsin-Ying, both of Taiwan

[73] Assignee: Industrial Technology Research Institute, Hsinchu, Taiwan

[21] Appl. No.: 683,468

[22] Filed: Jul. 18, 1996

[51] Int. Cl.$^6$ .................................................. B65G 47/46
[52] U.S. Cl. ............................. 198/370.09; 198/370.1
[58] Field of Search .................... 198/370.01, 370.1, 198/370.08, 370.09

[56] References Cited

U.S. PATENT DOCUMENTS

| | | | |
|---|---|---|---|
| 2,362,079 | 11/1944 | McCann et al. | 198/370.1 X |
| 3,384,237 | 5/1968 | Leonard | 198/370.08 X |
| 3,645,379 | 2/1972 | Kornylak | 198/370.09 |
| 3,710,917 | 1/1973 | Black et al. | 198/370.09 |
| 4,200,178 | 4/1980 | Gunti | 198/370.1 |

*Primary Examiner*—James R. Bidwell
*Attorney, Agent, or Firm*—Roth & Goldman

[57] ABSTRACT

A chain type transfer device, particularly suitable for use with roller conveyors for shifting operation, comprises a motor, two supporting plates, a plurality of rotating shafts, a plurality of driving sprockets, a plurality of guiding plates and a plurality of composite chains; wherein each rotating shaft is pivoted between the two supporting plates and the driving sprockets are secured to the two ends of each of the rotating shafts to be associated with the respective guiding plate for the extension of the respective endless composite chain. The composite chain is formed by combining a regular chain with a roller chain which has a plurality of free rollers pivoted to an outer side thereof. Each composite chain is located between two adjacent rollers of the roller conveyor with the free rollers movable to be higher than the conveyance surface of the conveyor while the regular chain lower than the conveyance surface so that when the motor drives the rotating shafts to move the chains via the sprockets, the free rollers are moved to be higher than the conveyance surface to contact and raise a conveyed article to separate from the rollers of the conveyor and thus achieving the shifting operation including vertically elevating and horizontally moving.

7 Claims, 8 Drawing Sheets

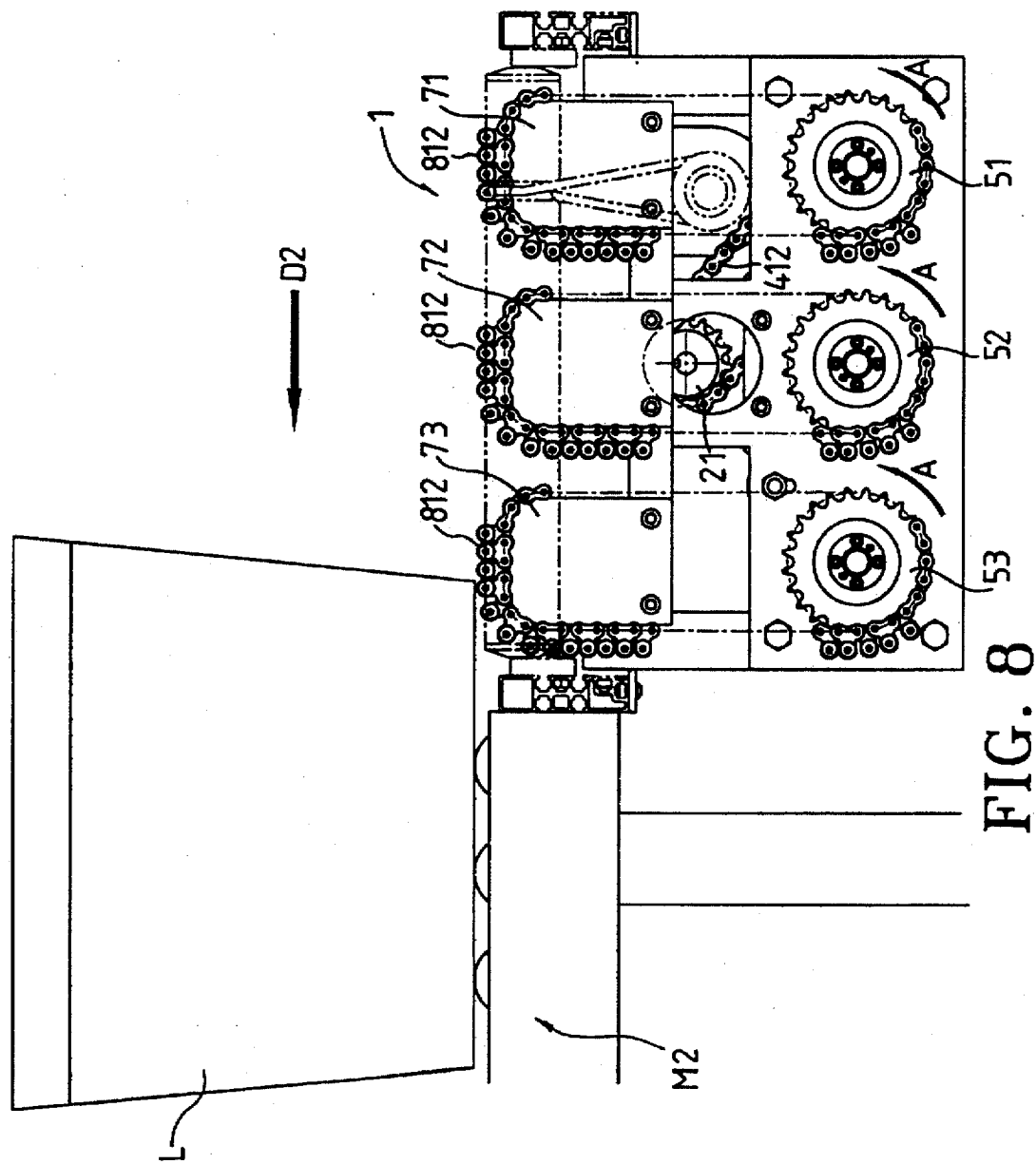

CHAIN TYPE TRANSFER DEVICE

BACKGROUND OF THE INVENTION

1. Field of the Invention:

The present invention relates generally to a right-angle transfer device for use with a roller conveyor, and in particular to a transfer device to achieve elevating and shifting operations.

2. Description of the Related Art:

A right-angle transfer device used in a common roller conveyor is capable of transferring a conveyed article to another conveyor that is moving in a direction normal to the original conveying direction. An elevatory right-angle transfer device is capable of elevation and right-angle transfer of the conveyed article, in order to eliminate the damage caused by contact abrasion between the conveyed article and the rollers of the roller conveyor during shifting. Such a device conventionally requires two power sources to individually perform the elevating and shifting operations. Consequently, it is not possible to effectively cut down the cost by eliminations of a power source in conventional systems.

Further, the transferring speed of the conventional transfer device has to be consistent with the conveying speed of the conveyor to which the article is to be shifted in order to eliminate the contact abrasion between the conveyed article and the transfer device. Thus, in a high conveying speed situation, the right-angle transfer device usually generates an impact upon the conveyed article making such a device unsuitable for conveying articles that are not capable of sustaining an impact. In a low conveying speed situation, the shifting efficiency is limited by the shifting speed and is thus not possible to be increased in conventional systems.

It has been recognized that it would be advantageous to provide an elevatory right-angle transfer device that makes use of only one single motor. The single motor optimally will serve as the power source for performing the elevating and right-angle shifting of a conveyed article, by cooperating with a simple mechanism for the purpose of simplifying the control thereof, reducing the cost and providing better practical and economic effectiveness. Further, it has been recognized that it is advantageous if the shifting speed of the transfer device is not limited by the conveyance performance of the conveyor and is capable of eliminating the impact on the conveyed articles and thus increasing the shifting efficiency.

SUMMARY OF THE INVENTION

The right-angle transfer device in accordance with the present invention comprises a motor, two supporting plates, a plurality of rotating shafts, a plurality of driving sprockets, a plurality of guiding plates and a plurality of composite chains, wherein the two supporting plates are arranged upright, parallel to and opposite of each other with the plurality of rotating shafts pivoted between the two supporting plates; the driving sprockets are respectively secured to the two ends of each of the rotating shafts, with the guiding plates disposed at corresponding positions above the sprockets to allow the respective composite chains to extend between the driving sprocket and the guiding plate; the composite chains are formed by combining a top roller chain having free rollers pivoted on the top side thereof with a regular chain. The rotating shafts are rotated by the motor and in turn drive the sprockets so as to move the composite chains.

In mounting to a roller conveyor, the composite chains are arranged between two adjacent rollers of the roller conveyor with the roller chain higher than the top edge of the rollers (conveyance surface) and the altitude of the regular chain lower than the top edge of the rollers (conveyance surface). When the composite chains are not moved by the motor, the regular chain is positioned lower than the conveyance surface, and do not interfere with the conveyance operation of the conveyor.

In performing a branching shift operation, the power of the motor is transmitted to drive the composite chain for moving the top roller chains over the rails so as to have the rollers of the top roller chains gradually rise above the conveyance surface to elevate an article moved along the conveyor. The composite chains so driven are also capable of shifting the conveyed article. Similarly, if the conveyed article is to be in-loaded from a branch conveyor by means of the roller chains, then when the regular chains are moved to be positioned on the rails, the conveyed articles are lowered down onto the roller conveyor with which the shifting device of the present invention is mounted and thus completing the converging shift operation. The present inventive device requires only one single motor as the power source for driving the composite chains to achieve the operations of elevation and shift.

Since the rollers mounted to the composite chains are free rollers, when the operation speed of the composite chains is different from the speed of the shift target conveyor, the speed difference between the two is absorbed by the free rollers located under the conveyed article. Thus, when the conveying speed of the conveyor is faster, the slower composite chains buffer the impact that occurs during the elevation and shift operations of the conveyed article; when the conveying speed of the conveyor is slower, the faster composite chains can increase the moving speed of the article when it arrives at the location where it is no longer associated with the conveyor speed. This is to increase the efficiency of shift operation.

Other objects, structures, functions, features and operations of the present invention will be better understood from the preferred embodiment shown in the accompanying drawings.

BRIEF DESCRIPTION OF THE DRAWINGS

FIG. 8 is a schematic view of the operation of the present invention as illustrated in FIG. 6, showing that the conveyed article has been shifted by the free rollers of the composite chains from one conveyor to another conveyor.

DETAILED DESCRIPTION OF THE PREFERRED EMBODIMENTS

Figure 1:
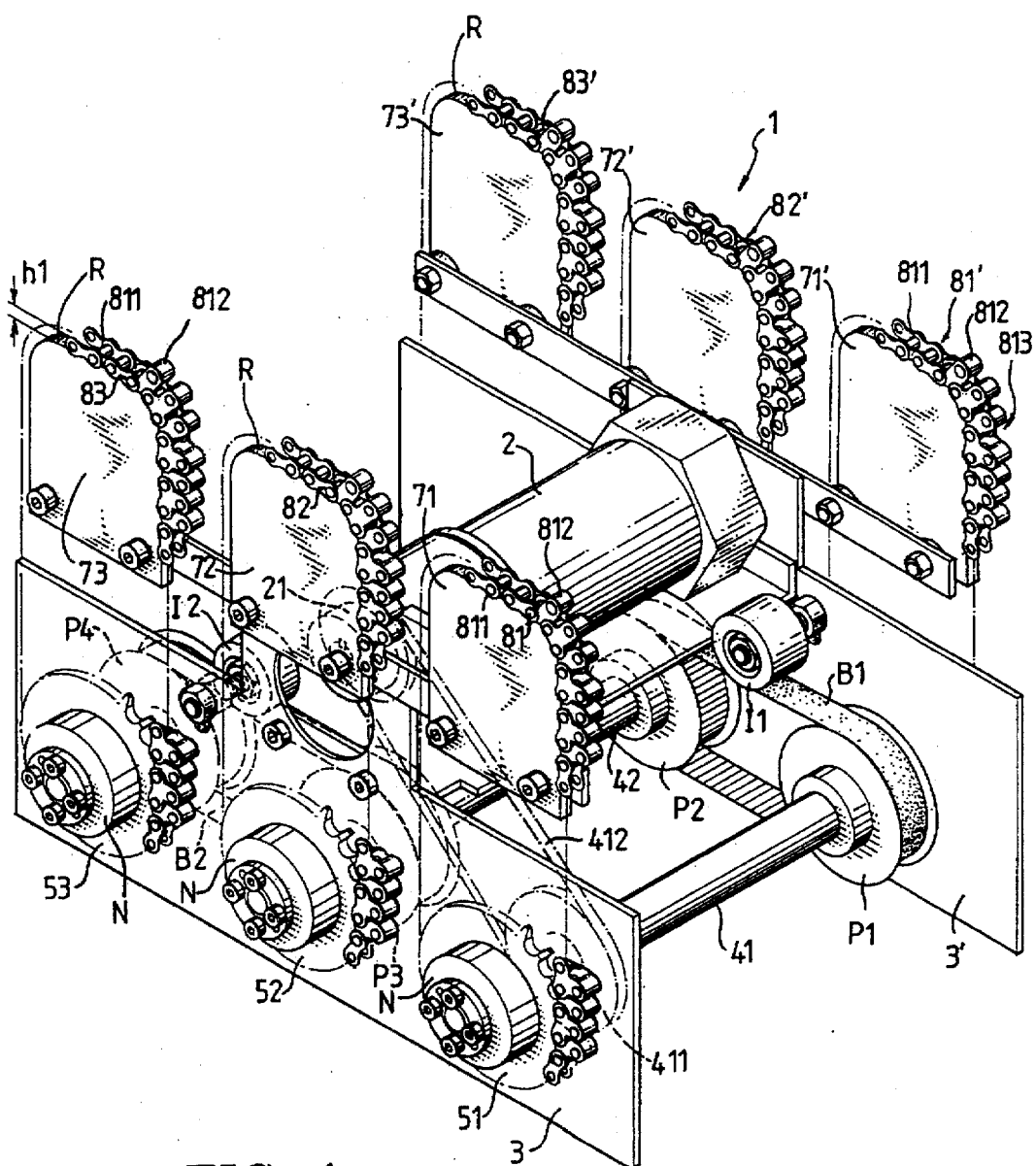
FIG. 1 is a perspective view schematically showing a chain type transfer device in accordance with the present invention.

FIGS. 1, 2, 3 and 4 show a preferred embodiment of a chain-type transfer device 1 constructed in accordance with the present invention that essentially comprises an electrical motor 2, two upright supporting plates 3, 3', three rotating shafts 41, 42, 43, six driving sprockets 51, 51' 52, 53 (the driving sprockets on the opposite sides of the driving sprockets 52 and 53 respectively are not shown), six guiding plates 71, 71', 72, 72', 73, 73' and six composite chains 81, 81' 82, 82', 83, 83'; wherein the two supporting plates 3, 3' are disposed upright to be parallel with and opposite to each other to allow the three rotating shafts 41, 42, 43 to be pivotally mounted between the two supporting plates 3, 3' and parallel with one another. Each rotating shaft 41, 42, 43 has two end portions respectively pivotally carried by the supporting plates 3, 3' by means of bearings, the driving sprockets 51, 51' 52, 52' 53, 53' are respectively secured to the two end portions of the rotating shafts 41, 42, 43 by means of non-keyed lock-in rings N.

Figure 2:
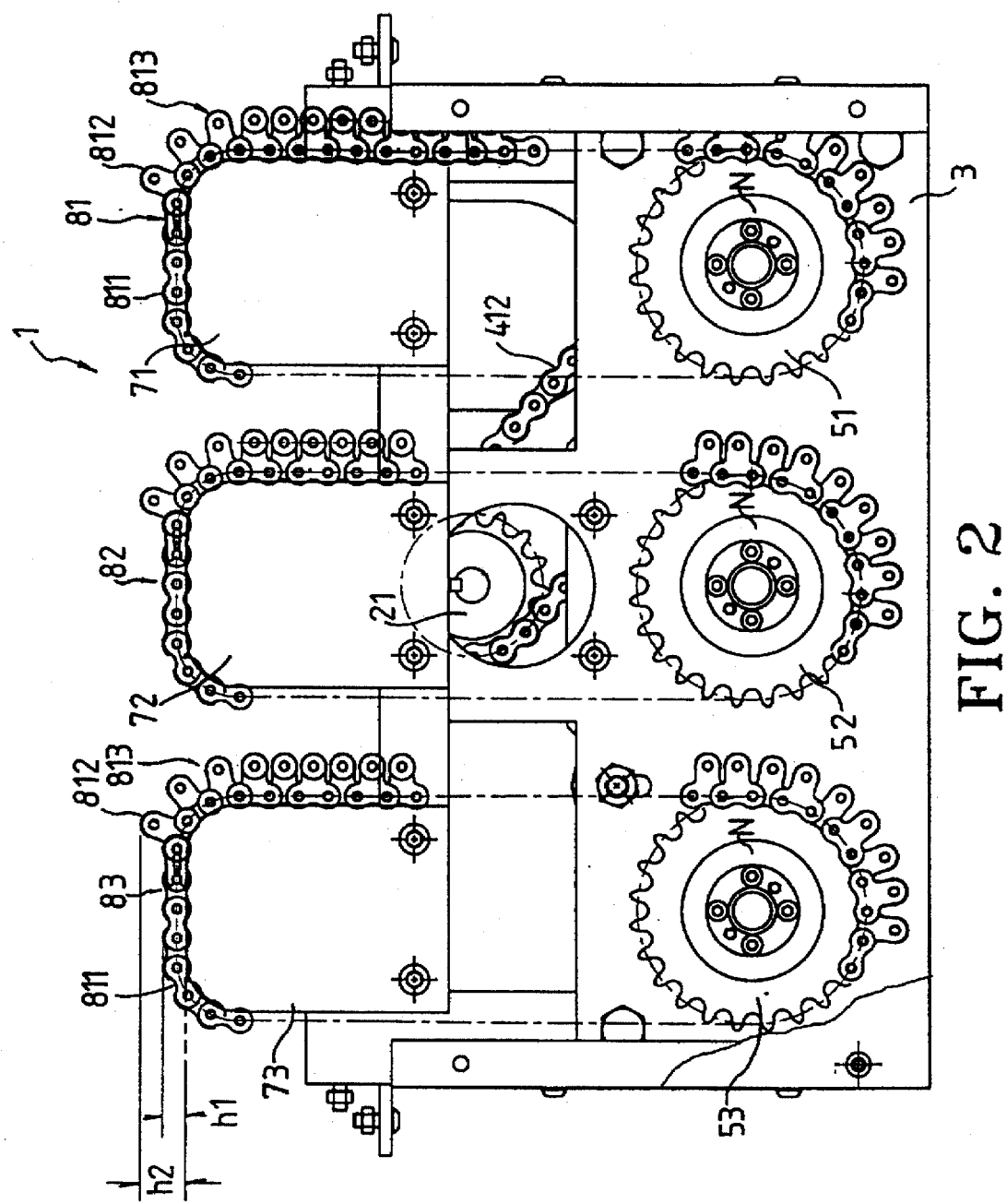
FIG. 2 is a front view of the present invention showing FIG. 1, showing the relationship between the driving sprockets and the composite chains.

The guiding plates 71, 71', 72, 72' 73, 73' are respectively disposed at corresponding positions above the sprockets 51, 51', 52, 52', 53, 53' and each has a top edge configured as a rail R for guiding the sliding movement of the respective chain. The composite chains 81, 81', 82, 82', 83, 83' are formed by combining a regular chain 811 with a roller chain 813 which comprises a plurality of free rollers 812. The free rollers 812 are consecutively pivoted to the outer side of the chain 813, extending over a length thereof, to freely roll. The composite chains 81, 81' 82, 82', 83, 83' respectively extend between the sprockets 51, 51' 52, 52', 53, 53' and the guiding plates 71, 71' 72, 72' 73, 73' and are driven by the sprockets to slide over the rails R. Referring to FIG. 2, the regular chains 811 have a top edge defining a first height hi with respect to the rails R, and the free rollers 812 have a top edge defining a second height h2 with respect to the rails R.

Figure 3:
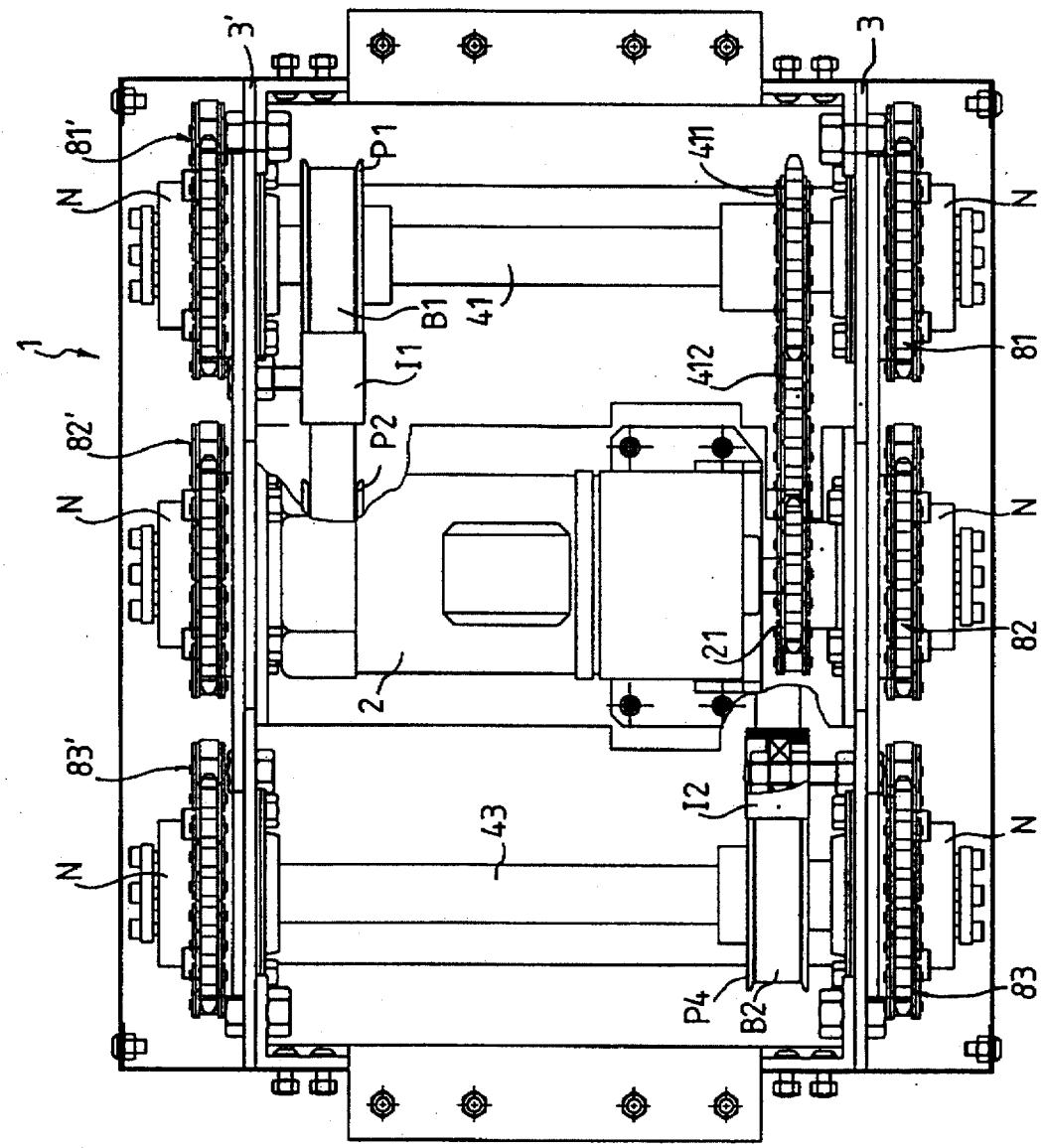
FIG. 3 is a top plan view of present invention shown in FIG. 1.
Figure 4:
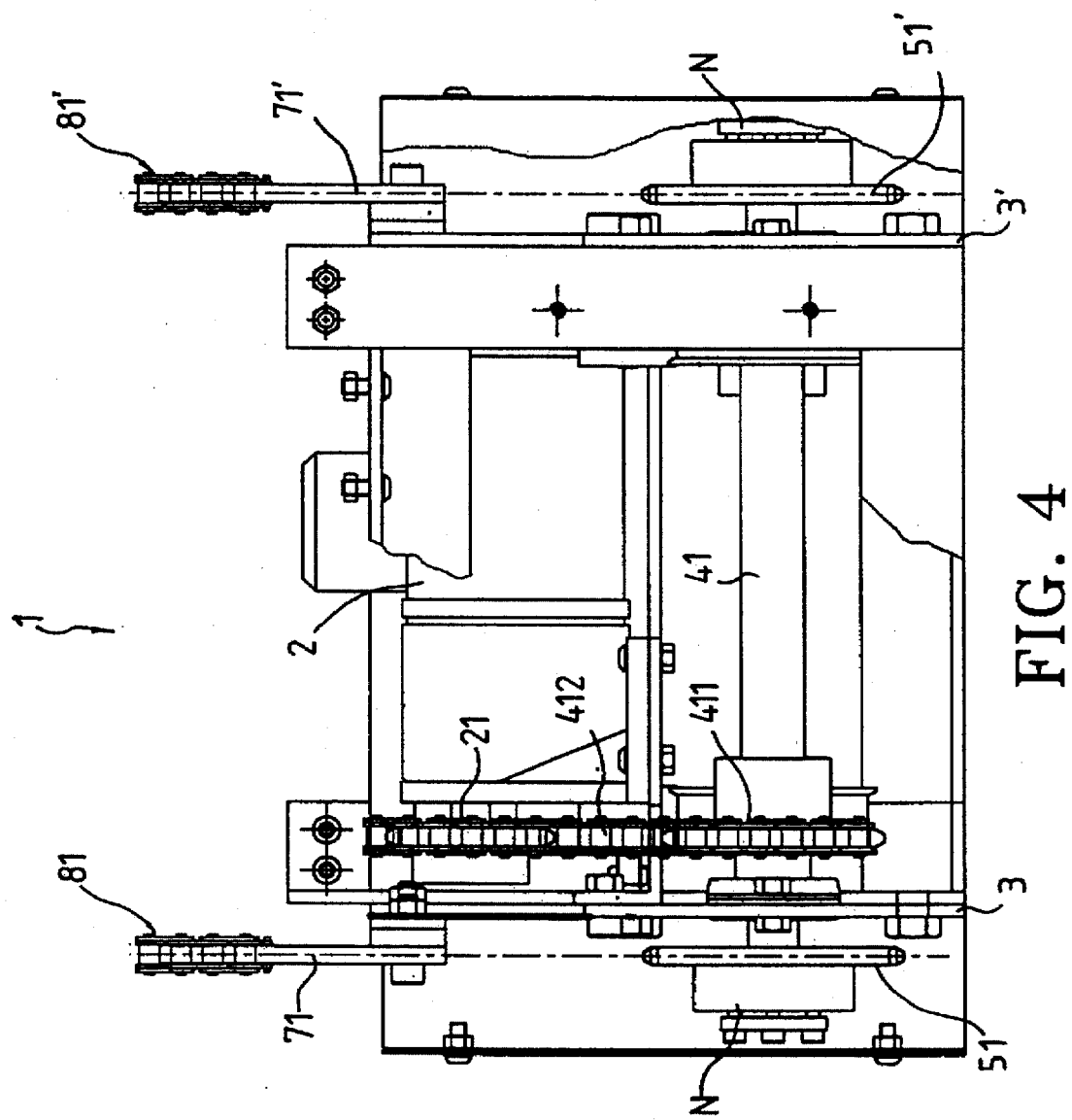
FIG. 4 is a right hand side elevational view of the present invention shown in FIG. 1.

As shown in FIGS. 1 and 3, the rotating shafts 41 and 42 are driven to rotate synchronously by a transmission means consisting essentially of the belt pulleys P1, P2 in association with the toothed belt B1. The rotating shafts 42 and 43 are driven to rotate synchronously by a transmission means consisting essentially of the belt pulleys P3 and P4 in association with the toothed belt B2. The toothed belts B1, B2 are tension-adjustable by means of idle pulleys I1, I2 disposed against them.

As shown in FIG. 1, the electrical motor 2 is disposed between two support plates 3, 3', and has a spindle (not shown) with a sprocket 21 mounted on an end thereof. The rotating shaft 41 also comprises a sprocket 411 through which the electrical motor 2 drives the rotating shaft 41 via a chain 412 and synchronously moving the rotating shafts 42, 43 so as to have the driving sprockets 51, 51', 52, 52', 53, 53' drive the composite chains 81, 81' 82, 82', 83, 83' and thus allowing the free rollers 812 to be pulled to slide over the rails R.

Figure 5:
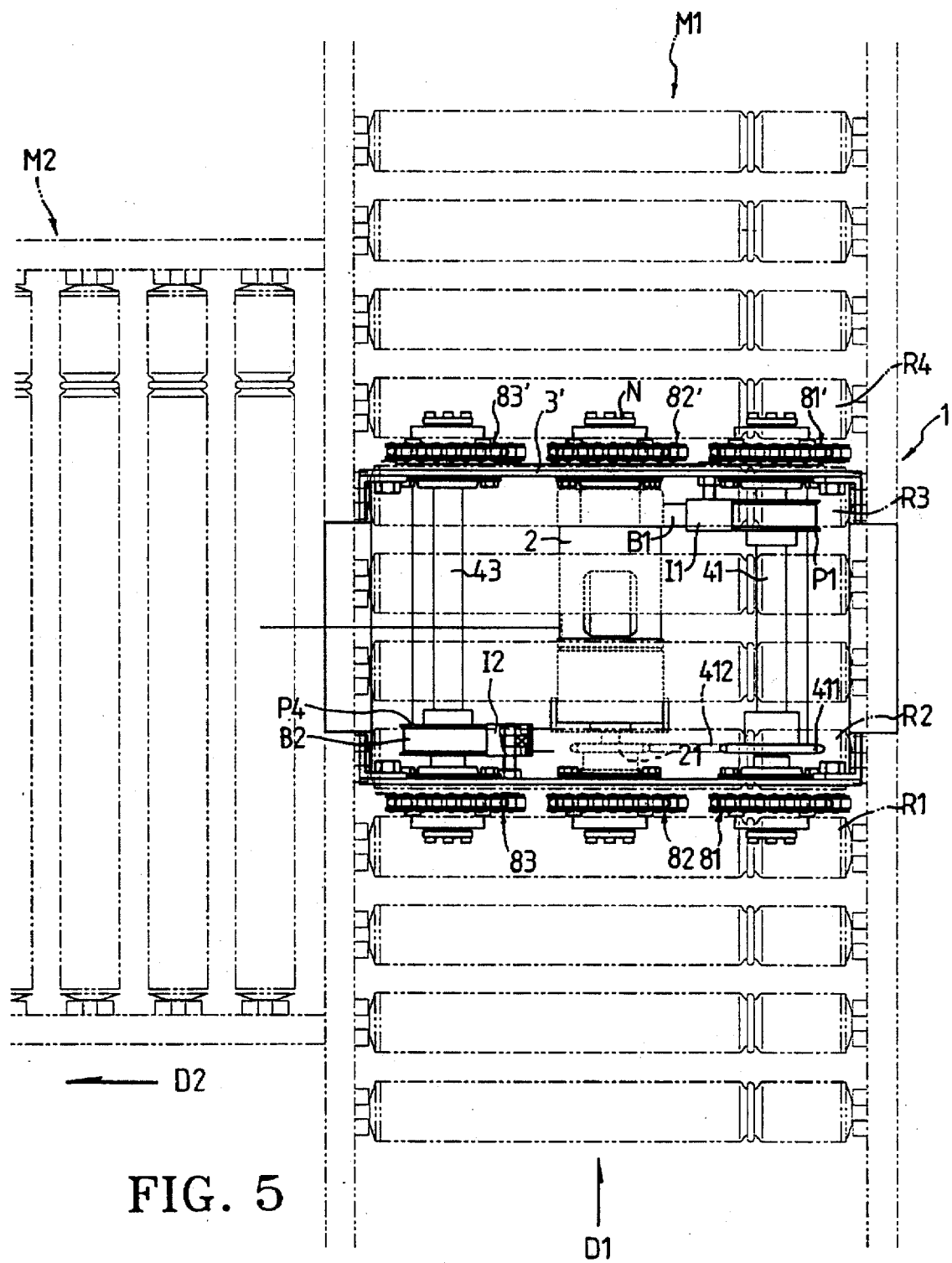
FIG. 5 is a top plan view of an application of the present invention, showing the chain type transfer device in accordance with the present invention mounted under a roller conveyor with composite chains thereof located between two adjacent rollers to correspond to the arrangement of another, right-angle disposed conveyor.
Figure 6:
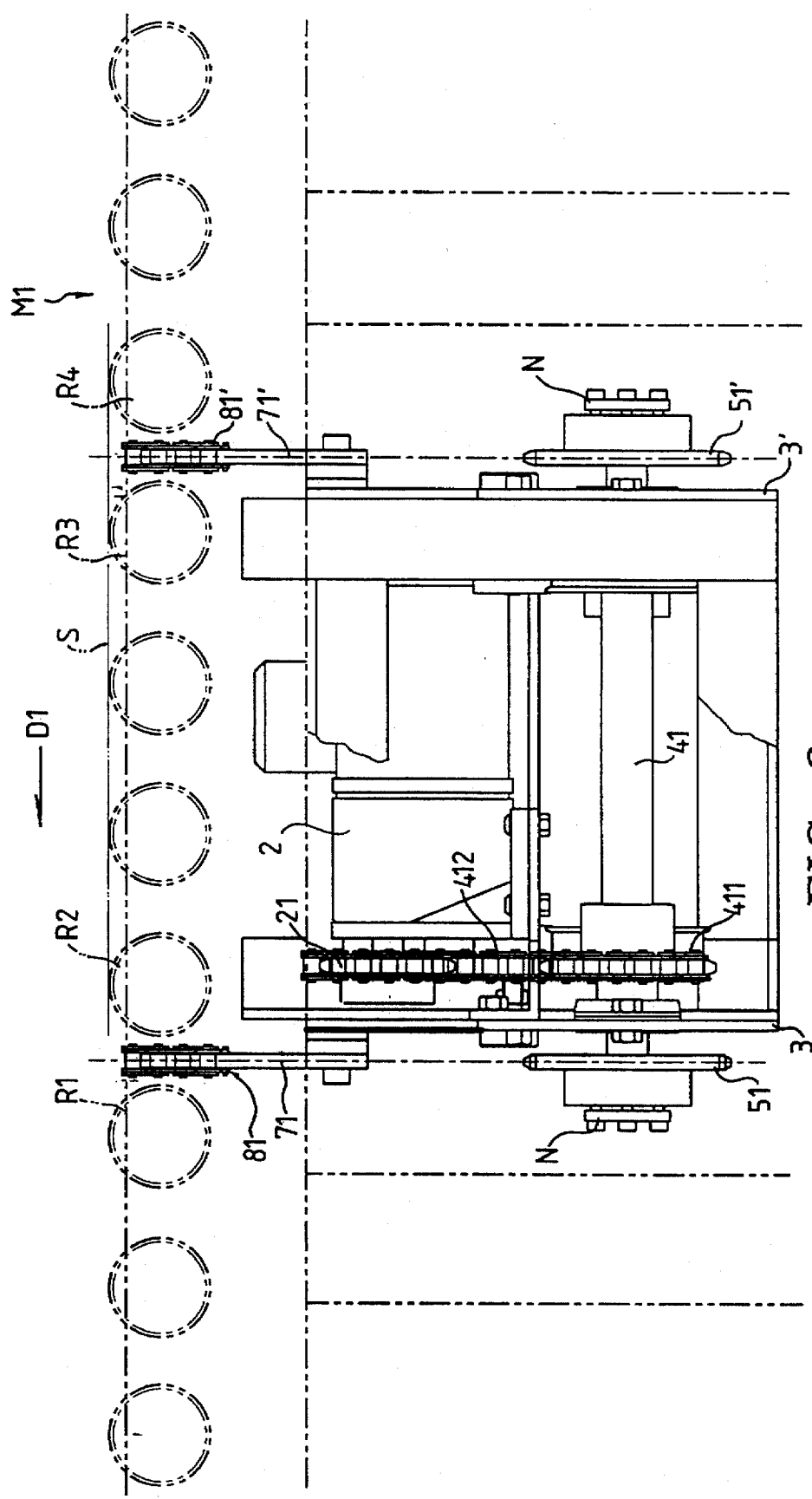
FIG. 6 is a side elevational view of the system shown in FIG. 5 showing the installation of the chain type transfer device in accordance with the present invention, illustrating that the composite chains are lower than the top edge of the rollers of the conveyor (conveyance surface) when the transfer device is not actuated.

As shown in FIGS. 5 and 6, the chain-type transfer device 1 in accordance with the present invention is mounted under a roller conveyor M1 with the composite chains 81, 81' 82, 82', 83, 83' being arranged to two rows respectively located between two adjacent rollers R1, R2 and R3, R4. Another roller conveyor M2 is arranged on one side of the roller conveyor M1 with the conveying direction thereof substantially normal to the conveying direction of the roller conveyor M1.

Figure 7:
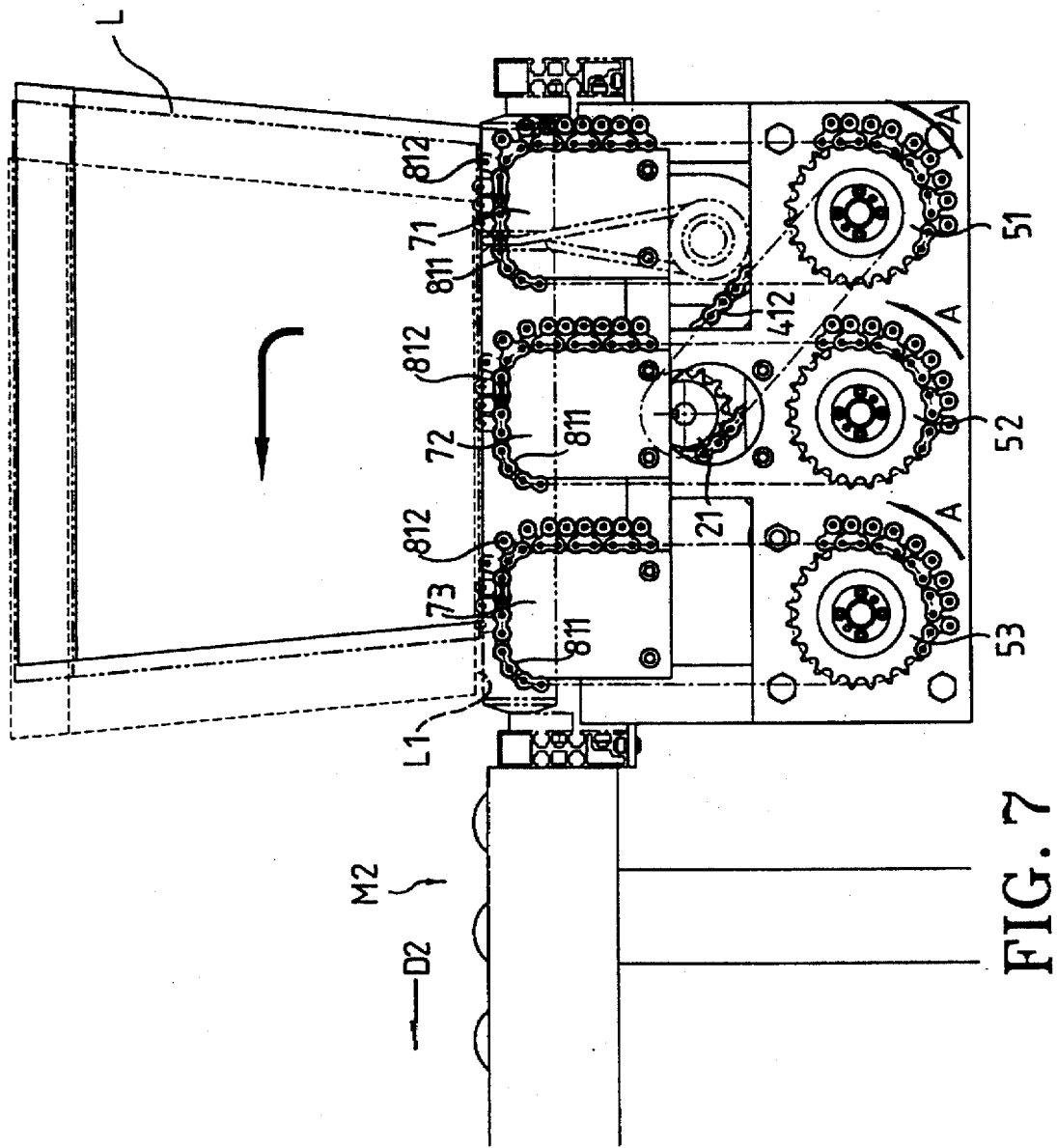
FIG. 7 is a schematic view of the operation of the present invention as illustrated in FIG. 6, showing that the free rollers of the composite chains are moved by the chains to elevate the conveyed article loaded on the conveyor in order to separate the article from the rollers and horizontally be shifted to another conveyor.

As shown in FIGS. 2, 5 and 6, when the transfer device 1 is not actuated, the regular chain 811 is at a standstill on the rails R with the first height h1 thereof at a position lower that the top edge of the rollers of the roller conveyor M1 (namely the conveyance surface S) so that the rollers of the roller conveyor M1 are allowed to keep in contact with the bottom side of a conveyed article L (as shown in FIGS. 7 and 8) to proceed in the original conveying direction D1 for conveying the article. As can be seen in FIGS. 7 and 8, which show the shifting operation of a conveyed article from the roller conveyer M1 to the roller conveyor M2, when the conveyed article L moves to the position just above the shifting device 1 of the present invention, its movement is halted by means of a blocking device (not shown) or by cutting off the power of the rollers of the conveyor. At the same time, the transfer device 1 is actuated and the motor 2 is powered to drive the sprockets 51, 51' 52, 52' 53, 53' to move the composite chains 81, 81' 82, 82' 83, 83' so as to make the free rollers 812 of each composite chain approach the rails R of the guiding plates 71, 71', 72, 72' 73, 73'. The second height h2 of the free rollers 812 with respect to the rails R (as shown in FIG. 2) is selected to be higher than the top edge of the rollers (namely the conveyance surface S); thus, when the free rollers 812 approach the rails R (as shown in FIG. 7), the free rollers 812 which are supported by the respective guiding plates 71, 71', 72, 72' 73, and 73' contact and gradually raise the conveyed article L to separate the article form the conveyance surface S of the conveyor M1 (namely the top edge of the rollers) and to be no longer moved by the rotation of the rollers.

When the rollers 812 come in contact with the bottom side L1 of the conveyed article L they will cause scratches or damage to the bottom side L1 of the conveyed article L since the free rollers 812 are allowed to roll freely; they will also raise the conveyed article L upward. When the composite chains 81, 81' 82, 82' 83, 83' continue to move, the conveyed article L is raised by the free rollers 812 to separate from the conveyance surface S of the conveyor M1 and moves with the composite chains toward another roller conveyor M2 to complete the branching shift operation.

In shifting a conveyed article L from the conveyor M2 to conveyor M1, the motor 2 is actuated to rotate in a reversed direction from that described above upon the approach of the conveyed article L moving toward conveyor M1 by conveyor M2. This will cause the sprockets 51, 51' 52, 52' 53, 53' to rotate in a direction opposite to that indicated by the arrows shown in FIGS. 7 and 8. This allows the free rollers 812, mounted on the composite chains 81, 81' 82, 82' 83, and 83' to engage the conveyed article L to move from left to right and to have it supported on the transfer device 1 to be moved away by the conveyor M1. This completes the converging shifting operation.

When the transfer device 1 in accordance with the present invention is used in a right-angled transfer operation as shown in the drawings, users may select either one of the converging or branching shift operations as desired.

In the application of the invention to either converging operation or branching operation, due to the fact that the rollers 812 mounted to the composite chains 81, 81' 82, 82' 83, 83' are free rollers, when the speed of the composite chains 81, 81' 82, 82' 83, 83' is different from that of the conveyor M2 (see FIGS. 7 and 8) during the shifting, and while the conveyed article L is in contact with both free rollers 812 and the rollers of the conveyor M2, the speed of the conveyed article L is determined by the conveying speed of the conveyor M2. The speed difference between the conveyed article L and the composite chains 81, 81' 82, 82' 83, 83' is accommodated and transitionally reduced due the rolling of the free rollers 812 so that the speed of shifting can be different form the conveying speed of the mated conveyor.

What is claimed is:

1. A chain type transfer device adapted to be mounted in a converging/branching point of a roller conveyor having a plurality of spaced and parallel rollers, comprising:

two supporting plates, disposed upright to be spaced from and parallel to each other;

a power motor, having a driving spindle and disposed between the two supporting plates;

at least two rotating shafts, each having two ends and disposed between the two supporting plates to be spaced from and parallel to each other, each two adjacent rotating shafts being driven synchronously with driving means and one of the rotating shafts being driven by the power motor;

a plurality of driving sprockets secured to the two ends of each of the rotating shafts;

a plurality of composite chains, each formed by combining a regular chain with a roller chain having outer side free rollers to provide an endless configuration, and each extending between the respective guiding plate and the sprocket to be driven by the sprocket to slide over the rail and defining a first height of a top edge thereof relative to the rail; the free rollers being pivoted to an outer side of the roller chain and extending over a length of the composite chain and defining a second height of a top edge thereof relative to the rails; said second height being greater than the first height;

wherein each of the composite chains extends parallel with and is located between two adjacent rollers of a roller conveyor to have the first height of the composite chain lower than a top edge of the rollers and the second height of the composite chain higher than a top edge of the rollers;

with the motor driving the rotating shafts to drive the sprockets for moving the composite chains, the free rollers of the composite chains being moved onto the rails between the two adjacent rollers and positioned higher than the top edge of the rollers so that the free rollers raise a conveyed article to separate it from the rollers, and so that the free rollers receive and move a conveyed article which is originally loaded on a branch conveyor and located at a height substantially the same as the second height of the free rollers and to lower it onto the rollers.

2. The chain type transfer device as claimed in claim 1, wherein each of the rotating shafts is pivoted to the two support plates by means of bearings.

3. The chain type transfer device as claimed in claim 1, wherein each two adjacent rotating shafts are coupled by means of belt pulleys and toothed belt to be rotatable in unison.

4. The chain type transfer device as claimed in claim 1, wherein one of the rotating shafts is driven by the power motor by using a sprocket and a chain.

5. The chain type transfer device as claimed in claim 1, wherein moving direction of the composite chains is changeable in accordance with rotating direction of the motor.

6. The chain type transfer device as claimed in claim 1, wherein the driving sprockets are secured to the ends of the rotating shafts by means of a non-keyed lock-in device.

7. The chain type transfer device as claimed in claim 1, wherein the composite chains continue moving after the conveyed article is raised by the free rollers and separated from the roller in order to shift the conveyed article in a direction normal to the original conveying direction.

* * * * *